(12) United States Patent
Hong et al.

(10) Patent No.: US 8,777,003 B2
(45) Date of Patent: Jul. 15, 2014

(54) TWO-PIECE PROTECTIVE CASE

(71) Applicant: Uncommon LLC, Chicago, IL (US)

(72) Inventors: John Hong, Chicago, IL (US); Scott Wilson, Chicago, IL (US); Dustin Brown, Chicago, IL (US); Jon Godston, Chicago, IL (US)

(73) Assignee: Uncommon LLC, Chicago, IL (US)

( * ) Notice: Subject to any disclaimer, the term of this patent is extended or adjusted under 35 U.S.C. 154(b) by 0 days.

(21) Appl. No.: 13/672,987

(22) Filed: Nov. 9, 2012

(65) Prior Publication Data

US 2013/0098790 A1    Apr. 25, 2013

Related U.S. Application Data

(60) Continuation-in-part of application No. 13/595,609, filed on Aug. 27, 2012, and a division of application No. 12/855,311, filed on Aug. 12, 2010, now Pat. No. 8,286,789.

(60) Provisional application No. 61/233,146, filed on Aug. 12, 2009.

(51) Int. Cl.
| | | |
|---|---|---|
| *B65D 85/00* | (2006.01) | |
| *B65D 85/30* | (2006.01) | |
| *A45C 11/00* | (2006.01) | |
| *B65D 81/02* | (2006.01) | |

(52) U.S. Cl.
CPC ................. *A45C 11/00* (2013.01); *B65D 81/02* (2013.01)

USPC ......................................... 206/320; 455/575.8

(58) Field of Classification Search
CPC ................................ A45C 11/00; B65D 81/02
USPC ............ 206/305, 320, 701; 220/8; 361/679.3, 361/679.4, 679.55, 679.56; 455/575.1, 455/575.4, 575.8; 379/433.11, 433.12; D3/218; D14/250
See application file for complete search history.

(56) References Cited

U.S. PATENT DOCUMENTS

| | | | | |
|---|---|---|---|---|
| 3,397,814 | A * | 8/1968 | Zackheim ...................... | 220/792 |
| 7,921,996 | B2 * | 4/2011 | Seo et al. ....................... | 206/320 |
| 7,930,011 | B2 * | 4/2011 | Shi et al. ........................ | 206/320 |
| 7,933,122 | B2 * | 4/2011 | Richardson et al. .......... | 206/320 |
| 8,167,127 | B2 * | 5/2012 | Martin et al. .................. | 206/320 |
| 8,655,422 | B2 * | 2/2014 | Stiehl et al. ................ | 455/575.8 |
| 2009/0114556 | A1 * | 5/2009 | Tai et al. ........................ | 206/320 |
| 2010/0096284 | A1 * | 4/2010 | Bau ................................ | 206/320 |
| 2011/0259664 | A1 * | 10/2011 | Freeman ........................ | 206/320 |

* cited by examiner

*Primary Examiner* — Luan K Bui
(74) *Attorney, Agent, or Firm* — Bishop Diehl & Lee, Ltd.

(57) ABSTRACT

A two-piece carrying case for a portable electronic device is disclosed. Generally speaking, the protective case includes a first body section and a second body section, each having a back surface, upturned sides, a connecting surface and a rim tightly bonded to an edge of the upturned sides of each body section. The rim defines an open area. The first and second body sections are joined by overlapping the respective connecting surfaces. Correspondingly aligned protrusions and depressions in the connecting surfaces retain the two sections in an overlapping configuration.

12 Claims, 9 Drawing Sheets

TWO-PIECE PROTECTIVE CASE

RELATED APPLICATIONS

The present application is a continuation in-part of and claims priority to U.S. patent application Ser. No. 13/595,609, filed on Aug. 27, 2012, which is a divisional of U.S. patent application Ser. No. 12/855,311, filed on Aug. 12, 2010, now U.S. Pat. No. 8,286,789, issued Oct. 16, 2012, which claims the filing priority of Provisional Application No. 61/233,146, filed on Aug. 12, 2009. Each of the above applications is hereby incorporated by reference.

TECHNICAL FIELD

The present invention relates to cases for electronic devices, and more specifically to two-piece protective cases.

BACKGROUND OF THE INVENTION

Mobile phone cases have very quickly blossomed into a multi-billion dollar industry. With each new entry into the field, phone cases become lighter, stronger, more colorful, and even more securable. Many phone case designers and manufacturers have focused on the primary purpose of a phone case—i.e., to protect the phone within—sacrificing aesthetics in some instances. In fact, the protective phone case has become such a necessary component of the phone itself, case manufacturers are often given new phone details well-ahead of the general public so that such cases are available as soon as a new phone reaches store shelves.

Two-piece cases are popular due to the ease with which they can be assembled around an electronic device. Typically, a first part is positioned about the device and then a second part is slid into contact. However, due to the ease of the sliding arrangement of the assembly in most cases, the two parts can easily become unexpectedly separated. In some cases, the result can be loss or damage of the protected device.

Until the invention of the present application, case manufacturers have failed to provide the necessary safeguards to maintain connection between two-piece cases. The present invention solves these and other problems which went either unnoticed, ignored or unsolved by those skilled in the art. The present invention provides a two-piece case design which is capable of being attached to a device by a user without fear of coming apart unexpectedly.

SUMMARY OF THE INVENTION

There is disclosed herein an improved protective carry case for a device, such as a portable electronic device (e.g., a phone, camera, PDA, etc.) which avoids the disadvantages of prior devices while affording additional structural and operating advantages.

Generally speaking, the protective case for a portable device comprises a first body section and a second body section, each having a back surface, upturned sides, and a connecting surface. A rim may also be affixed to an edge of the upturned sides of the body sections, the rim defining an open area. The two body sections are joined together by overlapping the respective connecting surfaces. To retain the overlap, at least one protrusion and a corresponding depression are positioned on opposing connecting surfaces. Once aligned, the protrusion enters the depression to "lock" the two body sections together.

In alternate embodiments, the protrusions and corresponding depressions may be on both sides, or it may be that all protrusions are on one surface and all corresponding depressions are on the opposing surface.

It is another aspect of an embodiment of the invention to provide at least one stop on the inner surface of the case for frictionally engaging another surface, such as that of the portable device to be encased. In the event a camera or other sound or image recording device is provided by the portable device, it is an aspect of an embodiment of the invention to provide a passage having an opening on each of the back surface and the inner surface of one of either the first body section or the second body section, the openings being connected by a sidewall. The sidewall is preferably slanted outward to lessen possible interference with the image and/or sound recording function.

These and other aspects of the invention can be more readily understood from a reading of the following detailed description accompanied by the appended drawing figures.

BRIEF DESCRIPTION OF THE DRAWINGS

The invention may be better understood with reference to the following drawings. The components in the drawings are not necessarily to scale, emphasis instead being placed upon illustrating the principles of the invention. In the drawings, like reference numbers designate corresponding parts throughout.

DETAILED DESCRIPTION OF THE INVENTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Referring to FIGS. 1-12, there is illustrated embodiments of a protective carrying case, generally designated by the number 10, for a portable electronic device (not shown). The particular illustrated embodiment is representative of a carrying case designed for an iPhone, manufactured by Apple, Inc. However, a carrying case 10 made in accordance with the present invention may be configured to fit any number of portable electronic devices, including other smart phones, PDA devices, calculators, cameras, global positioning system (GPS) devices, and the like. Those skilled in the relevant art will be able to understand and provide the required design changes to accommodate such alternate devices after a reading of the present detailed disclosure, including the appended drawing figures, without need for undue experimentation.

Reference numbers used within FIGS. 1-12 and in the detailed description to follow, correspond as shown to the following elements:

| Reference Number | Element |
| --- | --- |
| 10 | protective carrying case; |
| 12 | first body section; |
| 14 | second body section; |
| 16 | rim; |
| 17 | open area; |
| 18 | back surface; |
| 20 | bottom opening; |
| 22 | cavity; |
| 24 | inner surface; |
| 25 | edge; |
| 26 | upturned side; |
| 28a/28b | toggle button cover; |
| 30 | friction stop; |
| 32 | conical passage; |
| 34 | passage sidewall; |
| 36 | opening, inner surface |
| 38 | opening, back surface |
| 42 | extended flange; |
| 44 | receptacle; |
| 52 | protrusion; and |
| 54 | depression. |

With reference to an illustrated embodiment, a protective carrying case 10 includes a first body section 12 and a second body section 14. The first body section 12 and the second body section 14 are preferably formed of high-strength thermoplastic polymers such as ABS and polycarbonate materials known in the art. Each of the first and second body sections, 12 and 14, has a back surface 18 which transforms along an edge 25 into upturned sides 26. The edge 25 is preferably radiused to provide a smooth transition from back surface 18 to sides 26. However, the edge 25 may be in the form of a traditional 45 degree corner, or some variation, as well. When the two sections 12, 14 are connected together, a cavity 22 is formed as defined by an inner surface 24 of the body sections, 12, 14, and the upturned sides 26.

The first body section 12 also includes at least one integral toggle button cover 28 for aligning with control switches on the encased electronic device (not shown), such as for volume and on/off buttons. Toggle button covers 28 are preferably positioned within the upturned side 26 of either the first body section 12, the second body section 14, or both. In the illustrated embodiment, a volume toggle button cover 28a is positioned on a left or right side of the first body section 12 and an on/off toggle button cover 28b is positioned on a topside of the first body section 12. Additional toggle button covers may be used to suit the various configurations of other electronic devices.

Figure 1:
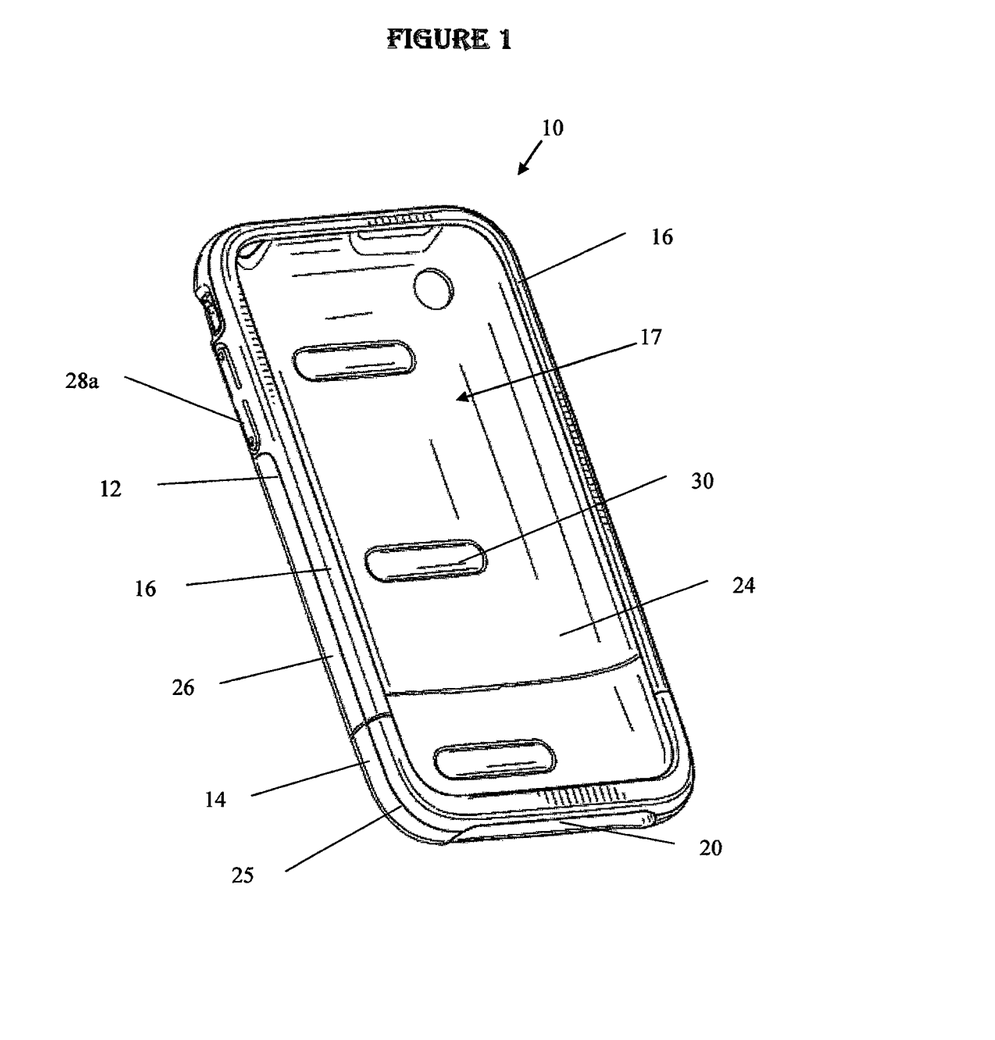
FIG. 1 is a perspective front view of an embodiment of a portable carrying case device in accordance with the present invention.
Figure 2:
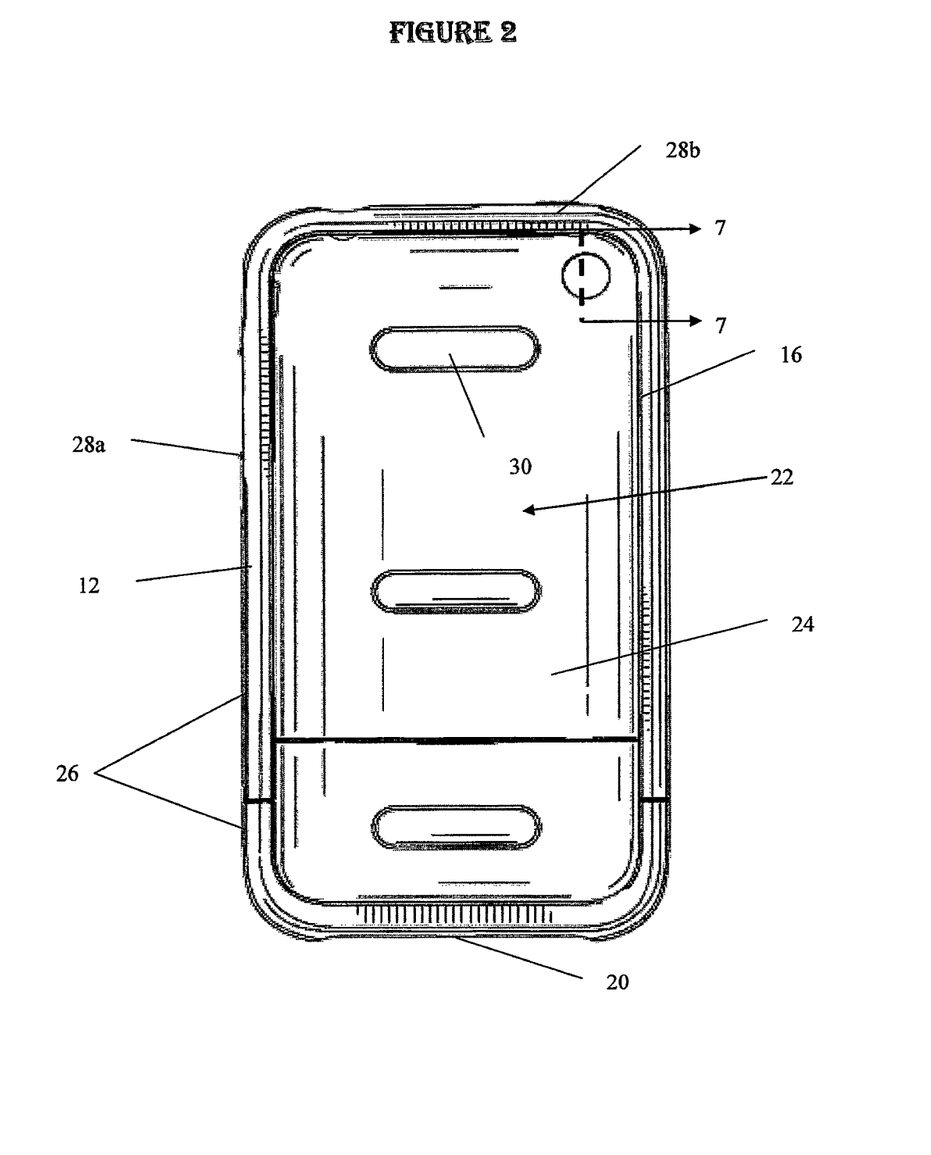
FIG. 2 is a front view of the portable carrying case device shown in the drawing of FIG. 1 and made in accordance with the present invention.
Figure 3:
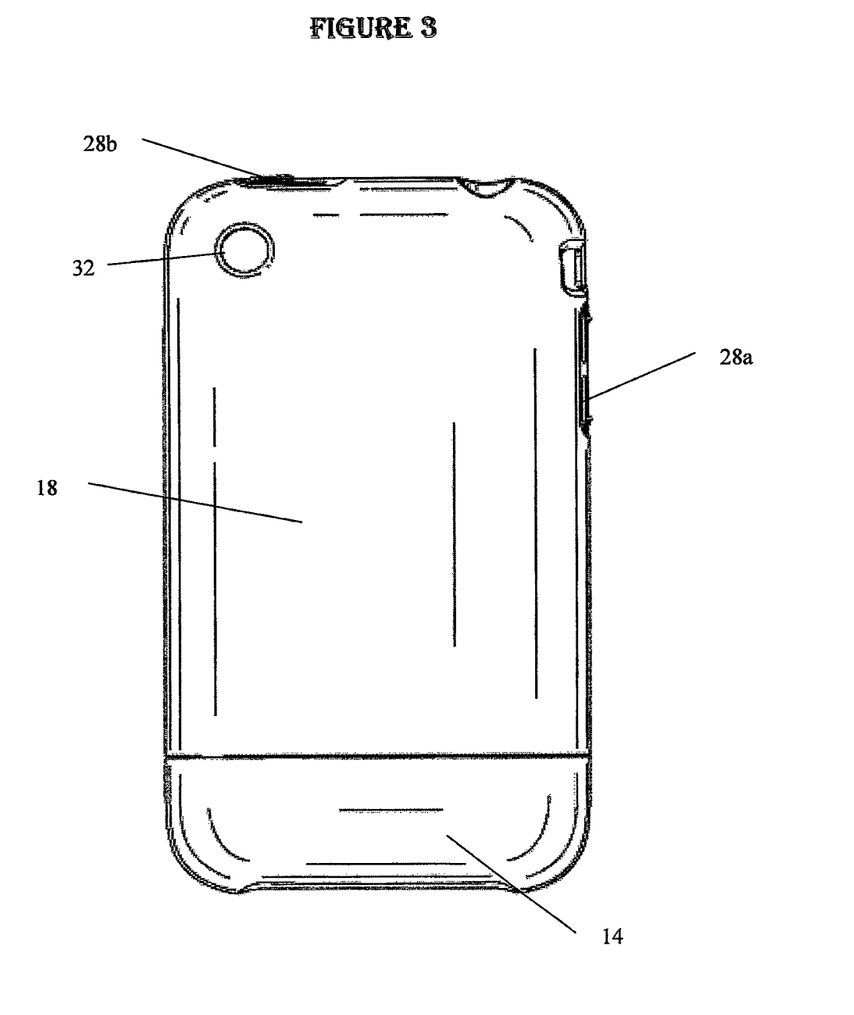
FIG. 3 is a back view of the portable carrying case device shown in the drawing of FIG. 1.
Figure 4:
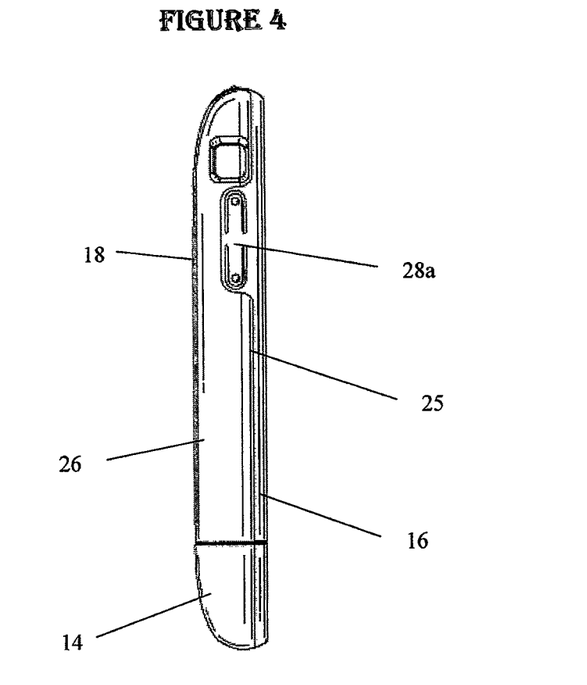
FIG. 4 is an enlarged side view of the portable carrying case device shown in the drawing of FIG. 1.
Figure 5:
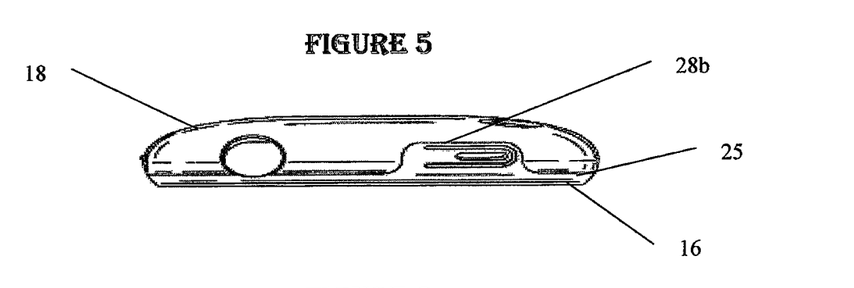
FIG. 5 is an enlarged top view of the portable carrying case device shown in the drawing of FIG. 1.
Figure 6:
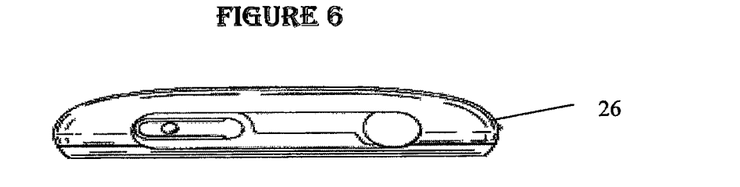
FIG. 6 is an enlarged bottom view of the portable carrying case device of FIG. 1.
Figure 8:
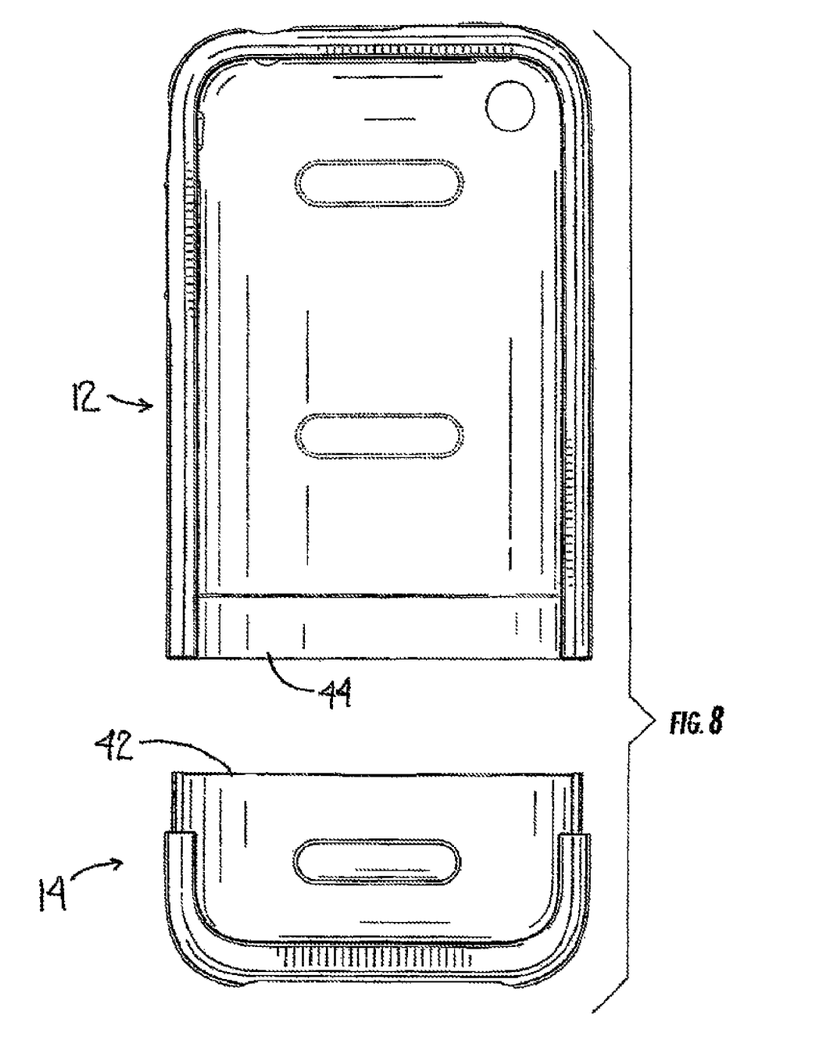
FIG. 8 is an enlarged front exploded view of the portable carrying case device of FIG. 1.

As shown best in FIGS. 2 and 8, a rim 16 is affixed to an edge of the upturned side 26 of both the first body section 12 and the second body section 14. The rim 16 provides a slight overhang to the cavity 22 to facilitate securing an electronic device within the carrying case. The rim 16 frames an open area 17 where typically display and/or keyboard functions are located.

The inner surface 24 of the case 10 may include a plurality of stops 30 for frictionally engaging an outer surface of an electronic device. The stops 30 are preferably comprised of a high-friction material, such as a rubber or other suitable polymer. In the preferred embodiment, for ease of placement, the stops 30 are substantially clear, dome-shaped decals which adhere to the inner surface 24 by any suitable adhesive. As shown, the stops 30, of which there are three, are horizontally located in an aligned arrangement on the inner surface 24 of the two-piece body sections 12, 14 to provide an overall, balanced engagement of the device. That is, the number and positioning of the stops 30 allows a portable electronic device (not shown) to be held securely after being slidably pushed into the case 10.

Another contemplated use for the inner surface 24 of the first body section 12 or the second body section 14 is as advertising space. For example, corporate logos, brand names and the like may be incorporated into the mold tooling.

Figure 9:
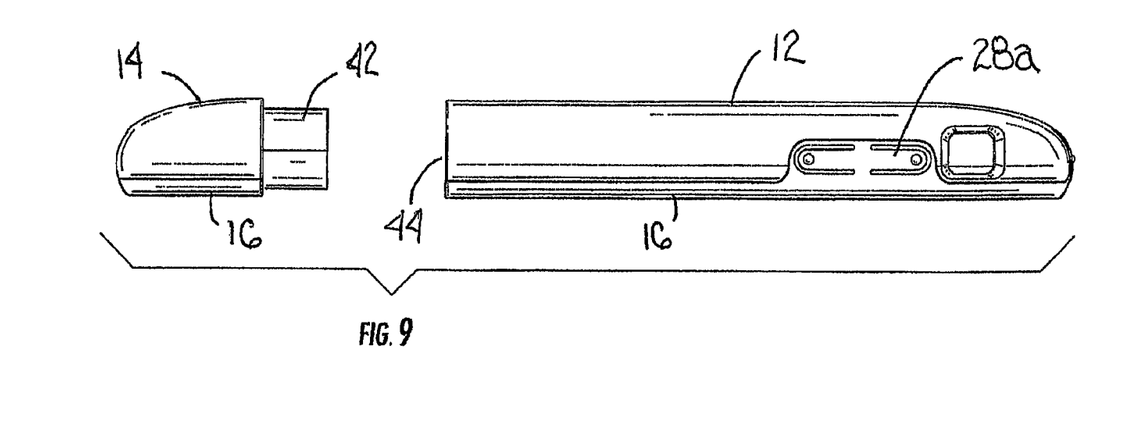
FIG. 9 is an enlarged side exploded view of the portable carrying case device of FIGURES.

With reference to FIGS. 8 and 9, the connection between the first body section 12 and the second body section 14 can be more readily understood. The second body section 14 includes an extended flange 42, while the first body section 12 includes a corresponding receptacle 44. After an electronic device is placed into the first body section 12, the flange 42 of the second body section 14 inserts into the receptacle 44 of the first body section 12 as the second body section is slid onto the device. The flange 42 and receptacle 44, which may be switched on the two bodies, mate frictionally to hold the first and second body sections, 12 and 14 about the device in a protective manner. Using similar polycarbonate material for the first body section 12 and the second body section 14 enables an exceptionally strong frictional engagement between the two bodies.

Further, it is also contemplated that the first body section 12 and the second body section 14, may be provided with contrasting colors to mask overprinting. Preferably, the first body section 12 is provided in black and the second body section 14 is provided in white. If ink is printed, for example, over the white section and overprints to the black section, the ink will not show on the black. The effect will be a clean line at the junction of the two colors. It will be understood that any contrasting color can be applied to the first body section 12 and the second body section 14 to accomplish the intended goal of the present invention.

As mentioned above, it has been determined that many materials, particularly plastics, are unable to withstand repeated high temperatures (e.g., 160° C. and up) for the required duration of the transfer process. For example, during a thermo transfer process wherein the dye from the preprinted film is introduced to the second body section 14, the dye may not be consistently transferred onto the entire second body section 14. In fact, it is not uncommon for the edge 25 of the second body section 14 which corresponds and aligns with the edge 25 of the first body section 12, to be susceptible to deformation at high temperatures. As a result, the quality of the transferred dye on the first body section 12 or the second body section 14 of the carrying case 10 may be functionally or aesthetically undesirable and even come off.

However, the rim 16 is tightly bonded to both body sections, 12 and 14, which accomplishes at least a few goals of embodiments of the present invention. First, the rim 16 creates a perfect line about the open area 17 much like the contrasting colors of the two sections, as described above. Second, the rim 16 is also able to mask many physical imperfections in the edge 25 as a result of the ink heat transfer (e.g., sublimation process). The rim 16 may also provide structural support to the case in many instances.

Therefore, it is preferably contemplated that the rim 16 affixed to both the first body section 12 and the second body section 14 is integrally bonded in either an injection molding or compression molding process. This subsequent bonding of the rim along an edge 25 of the upturned sides 26 of the first and second body sections, 12 and 14, ensures that any loosely transferred dye along this area of the first and second body sections 12, 14 is masked by the rim 16.

The use of visually contrasting colors or shades between the first body section 12 and the second body section 14 may have other additional benefits. For example, the contrasting color of the first body section 12 and the second body section 14, coupled with side toggle button cover 28 and a bottom opening 20 to accommodate a charging plug adapter, provides a user with a visual indication to confirm proper orientation of the housing. Further, the contrasting body sections can be used to indicate proper holding orientation of the device and to enhance visibility of the device. Alternatively or additionally, indicia may be printed on the back surface 18 of the case 10 or on the inner surface 24 of either body section 12, 14 to indicate proper orientation. Finally, the use of contrasting shades or colors between the two body sections 12, 14 provides the visual impression that the housing is thinner than other similar cases in the market used to protect a portable electronic device.

Figure 7:
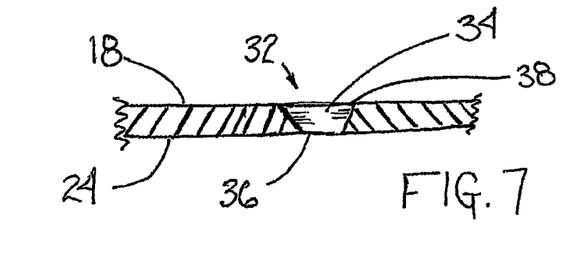
FIG. 7 is a partial cross-section of an embodiment of the passage provided to align with a camera feature (e.g., lens) on an electronic device.

Referring to FIG. 7, another optional feature of the present case 10, conical passage 32, can be seen. The conical passage 32 is used to align with the electronic device's camera lens feature. As such, the conical passage 32 is preferably positioned on the back surface 18 of the case 10 in either the first body section 12 or the second body section 14. The passage 32 has an opening at each of the back surface 18 and the inner surface 24 of the case. A slanted sidewall 34 connects the two openings. Preferably, the inner surface opening 36 has a diameter less than the back surface opening 38. This configuration provides that a greater amount of light will be able to enter the camera aperture for better quality pictures. The conical sidewall 32 also prevents a photo "flash" effect prevalent in devices using tubular passages where indirect light reflects from the sidewall to "wash-out" a portion of the photo.

Figure 10:
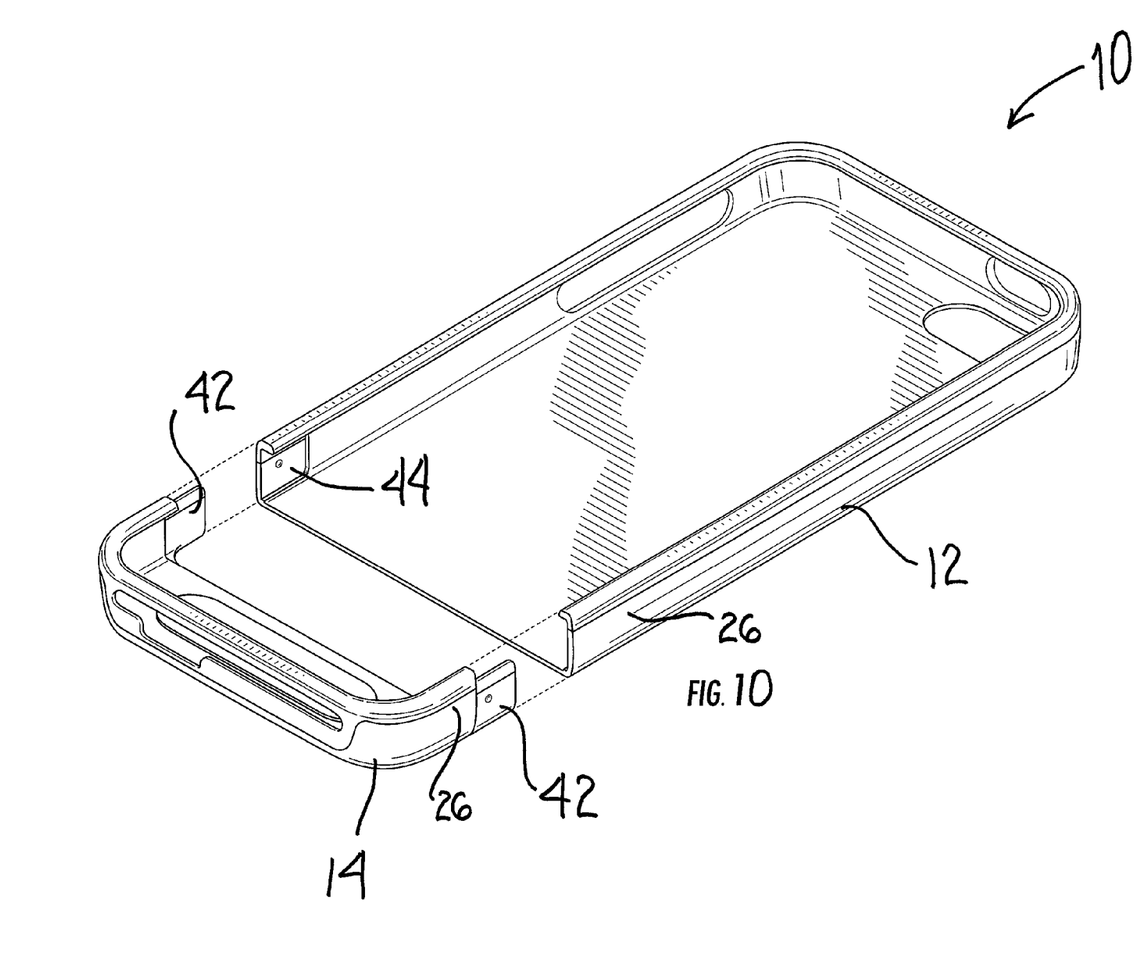
FIG. 10 is a perspective view of an embodiment of the present device.
Figure 11:
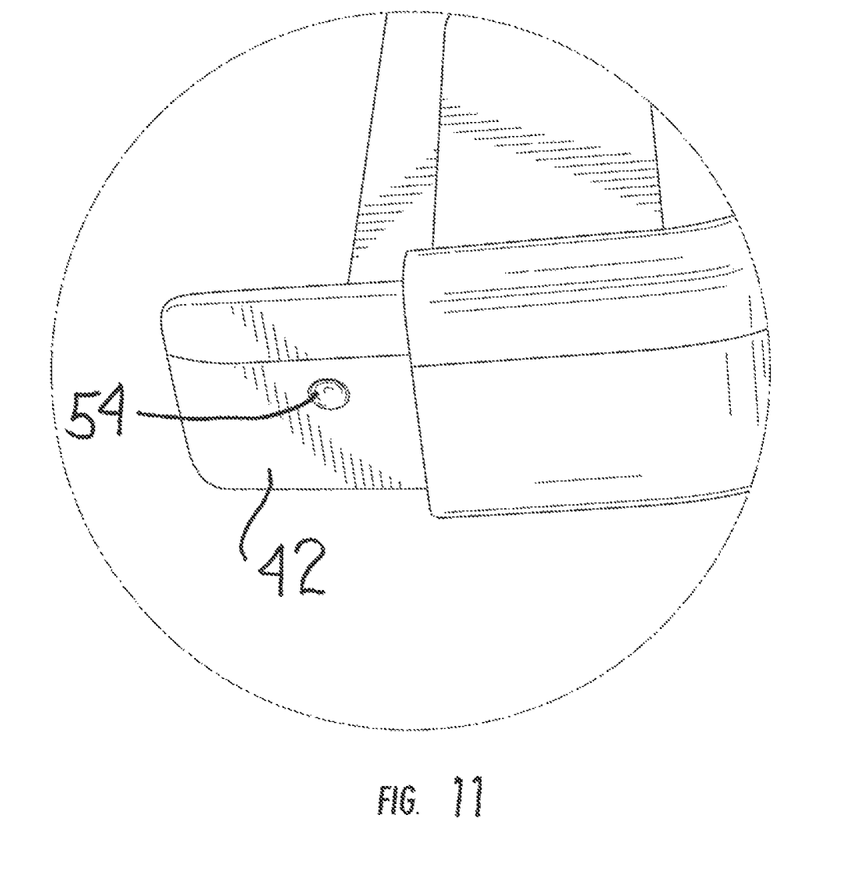
FIG. 11 is a close-up view of an extended flange having a depression thereon.
Figure 12:
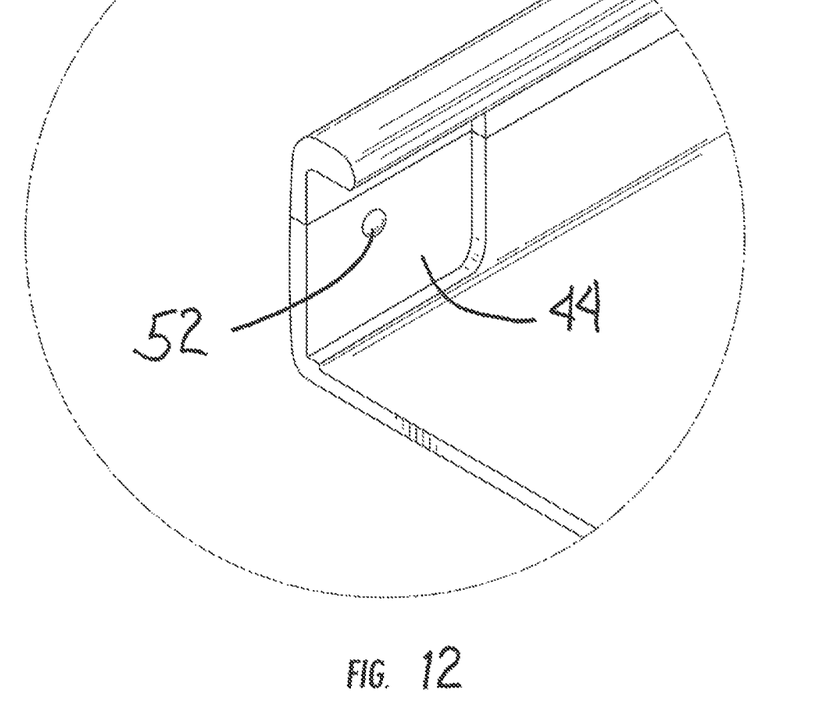
FIG. 12 is a close-up view of a receptacle having a protrusion thereon.

With respect to FIGS. 10-12, another embodiment of the disclosed case 10 is illustrated. The preferred connection between the two body sections, 12 and 14, may be more easily understood. As with the previous embodiment, each second body section 14 includes an extended flange 42, while each first body section 12 includes a corresponding receptacle 44. After an electronic device is placed into the first body section 12, the flange 42 of the second body section 14 inserts into the receptacle 44 of the first body section 12 as the second body section is slid onto the device. The flange 42 and receptacle 44, which may be switched on the two bodies, mate frictionally to hold the first and second body sections, 12 and 14 about the device in a protective manner. Using similar polycarbonate material for the first body section 12 and the second body section 14 enables an exceptionally strong frictional engagement between the two bodies. The receptacle 44 of first body section 12 is shown to be a recessed area primarily on the upturned sides 26, while the flange 42 of the second body section 14 is preferably a corresponding thin contiguous element extending from the body section 14. When the two sections, 12 and 14, are joined, the receptacle 44 of the first body section 12 envelops the flange 42 of the second body section 14. The upturned sides 26 of the two sections can operate as stops to limit the overlap of the two connecting surfaces (i.e., flange 44 and receptacle 42).

Further, to retain the two body sections, 12 and 14, in contact, an embodiment may utilize a system of protrusions 52 and depressions 54, as shown in FIGS. 11 and 12. The protrusions 52, as shown, may be small "bumps" raised on one of the connecting surfaces (i.e., flange 44 or receptacle 42), while the depressions 54 are recesses on the opposite connecting surface which align with a protrusion 52. Each of the connecting surfaces (i.e., flange 44 and receptacle 42) may include both protrusions 52 and depressions 54, or one may have only protrusions 52, while the other has only corresponding depressions 54. The number and location of the protrusions 52, and thus the corresponding depressions 54, may vary. Preferably, at least two protrusions 52 and two corresponding depressions 54, and as many as four of each, are used for most applications.

The relative flexibility of the flange 44 allows the two body sections, 12 and 14, to be brought together. Once the protrusions 52 and corresponding depressions 54 align, the connecting surfaces are temporarily "locked" together. The nested electronic device (not shown) provides an added bias to keep the mechanism joined. While the two joined and "locked" body sections, 12 and 14, will not easily unintentionally detach from one another, a typical user is still able to disjoin the two sections by pulling them in opposite directions.

It should be emphasized that the above-described embodiments of the present invention, particularly, any "preferred" embodiments, are possible examples of implementations merely set forth for a clear understanding of the principles for the invention. Many variations and modifications may be made to the above-described embodiment(s) of the invention without substantially departing from the spirit and principles of the invention. All such modifications are intended to be included herein within the scope of this disclosure and the present invention, and protected by the following claims.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A protective case for an electronic device, the case comprising:
    a first body section having a back surface, upturned sides and a connecting surface, wherein the connecting surface comprises first and second flanges extending from the upturned sides, each first and second flange having a forward edge and an outward facing closed depression thereon, and an integral third flange extending from the back surface between the first and second flanges;
    a second body section having a back surface, upturned sides and a connecting surface, wherein the connecting surface comprises first and second recessed areas positioned within the upturned sides and corresponding to the first and second flanges, respectively, and an inward facing protrusion positioned within each recessed area; and
    a first rim tightly bonded to an edge of the upturned sides of the first body section and a second rim tightly bonded to an edge of the upturned sides of the second body section;
    wherein the connecting surface of the first body section, including the first flange, second flange and integral third flange, inserts into the connecting surface of the second body section when the two sections are joined and the protrusion of each recessed area engages the corresponding depression of the first and second flanges to retain the connecting surfaces in a joined position, and the protrusions are symmetrically formed so as to engage and disengage from the corresponding depressions.

2. The protective case of claim 1, further comprising a passage having an opening on each of the back surface and an inner surface of one of either the first body section and the second body section.

3. The protective case of claim 1, wherein at least one of the first rim and the second rim includes at least one integral toggle button area.

4. The protective case of claim 1, further comprising an image printed on the back surfaces and upturned sides of the first and second body sections.

5. The protective case of claim 1, wherein the connecting surface of the second body section includes 2 to 4 protrusions and the connecting surface of the first body section includes 2 to 4 depressions corresponding to the protrusions on the opposing connecting surface.

6. The protective case of claim 1, wherein the first and second body sections are formed of a material different than that of the material for forming the first and second rims.

7. The protective case of claim 4, wherein the image on the first and second body sections has a pattern and the pattern of the first body section aligns with the pattern of the second body section when the two sections are joined.

8. A protective case for an electronic device, the case comprising:
- a first body section having a back surface, upturned sides and a connecting surface comprised of at least one flange extending from the upturned sides and an integral flange extending from the back surface;
- a first rim on the upturned sides of the first body section;
- a first bond formed between and along an edge of the first body section and the first rim;
- a second body section having a back surface, upturned sides and a connecting surface comprised of at least one recessed area positioned within the upturned sides;
- a second rim on the upturned sides of the second body section;
- a second bond formed between and along an edge of the second body section and the second rim;
- a passage having an opening on each of the back surface and an inner surface of one of either the first body section and the second body section;
- at least one inwardly facing protrusion positioned within the at least one recessed area on the connecting surface of the second body section; and
- a corresponding outwardly facing closed depression for each of the at least one inwardly facing protrusions, the corresponding depression being positioned on the at least one flange of the connecting surface of the first body section;

wherein the at least one flange of the first body section inserts into the at least one recessed area of the connecting surface of the second body section, the integral flange from the back surface of the first body section engages an area between the upturned sides of the second body section when the two sections are joined and the at least one protrusion aligns with the corresponding depression to retain the connecting surfaces in a joined position.

9. The protective case of claim 8, wherein at least one of the first rim and the second rim includes at least one integral toggle button area.

10. The protective case of claim 8, further comprising an image printed on the back surfaces and upturned sides of the first and second body sections.

11. The protective case of claim 8, wherein the first and second body sections are formed of a material different than that of the material for forming the first and second rims.

12. The protective case of claim 10, wherein the image on the first and second body sections has a pattern and the pattern of the first body section aligns with the pattern of the second body section when the two sections are joined.

* * * * *